United States Patent [19]
Geralde

[11] Patent Number: 5,820,504
[45] Date of Patent: Oct. 13, 1998

[54] TROCHOIDAL TOOTH GEAR ASSEMBLIES FOR IN-LINE MECHANICAL POWER TRANSMISSION, GEAR REDUCTION AND DIFFERENTIAL DRIVE

[75] Inventor: Robert E. Geralde, Salem, Ind.

[73] Assignee: Hawk Corporation, Cleveland, Ohio

[21] Appl. No.: 647,179

[22] Filed: May 9, 1996

[51] Int. Cl.⁶ ........................................... F16H 1/32
[52] U.S. Cl. ........................................ 475/177; 475/180
[58] Field of Search ................... 475/162, 176, 475/177, 180

[56] References Cited

U.S. PATENT DOCUMENTS

| | | |
|---|---|---|
| 1,682,563 | 8/1928 | Hill . |
| 1,833,993 | 12/1931 | Hill . |
| 2,031,888 | 2/1936 | Hill . |
| 2,250,259 | 7/1941 | Foote, Jr. ................... 475/177 |
| 2,389,728 | 11/1945 | Hill . |
| 3,853,435 | 12/1974 | Ogasahara et al. . |
| 3,899,270 | 8/1975 | Swedberg . |
| 3,910,732 | 10/1975 | Lusztig . |
| 4,134,713 | 1/1979 | Binaut . |
| 4,253,807 | 3/1981 | Pahl . |
| 4,569,644 | 2/1986 | Swedberg . |
| 4,718,378 | 1/1988 | Child . |
| 5,101,678 | 4/1992 | Inui ............................ 475/162 |
| 5,123,883 | 6/1992 | Fukaya ....................... 475/162 |
| 5,228,846 | 7/1993 | Lammers et al. ............ 418/61.3 |
| 5,429,556 | 7/1995 | Ishida et al. ................ 475/180 |
| 5,505,668 | 4/1996 | Koriakov-Savoysky et al. ....... 475/180 |
| 5,509,861 | 4/1996 | Wacinski .................... 475/162 |
| 5,536,218 | 7/1996 | Fukaya et al. .............. 475/178 |

FOREIGN PATENT DOCUMENTS

1753102-A1 8/1992 U.S.S.R. ................... 475/177

OTHER PUBLICATIONS

"Power Flow from the Motor" (Theory of Operation/Power Flow from the Motor) from the John Deere Manual pp. 250–10–10 to 250–10–13, Jul. 1989.

Primary Examiner—Charles A. Marmor
Assistant Examiner—Sherry Lynn Estremsky
Attorney, Agent, or Firm—Calfee, Halter & Griswold LLP

[57] ABSTRACT

Trochoidal tooth form gear assemblies for in-line mechanical power transmission, gear reduction and differential drive employ internally meshed gear sets having differing numbers of trochoidal gear teeth, all of which are in continuous contact as one gear rotates and orbits relative to another. Coupling and output rotors having external trochoidal gear teeth profiles rotate and/or orbit in mesh with conjugate internal trochoidal gear teeth in stators or coupling rotors. A differing number of teeth between the meshed external and internal gear teeth provides gear reduction of rotational speeds through axially aligned input and output shafts. In certain embodiments, couplers are eccentrically mounted upon axially extending pins to translate the orbital motion of a meshed gear to shaft rotation. The gear sets can be combined in series to provide various gear reduction ratios as functions of the differing number of meshed gear teeth. In a differential transaxle trochoidal gear assembly, coupling rotors having internal and external gear teeth are eccentrically mounted back-to-back 180° out of phase within a single internally-toothed ring gear to rotate in unison at constant speed rotation of the axles and in opposite directions upon differential axle speeds. Hypotrochroidal gear tooth forms are also described.

22 Claims, 11 Drawing Sheets

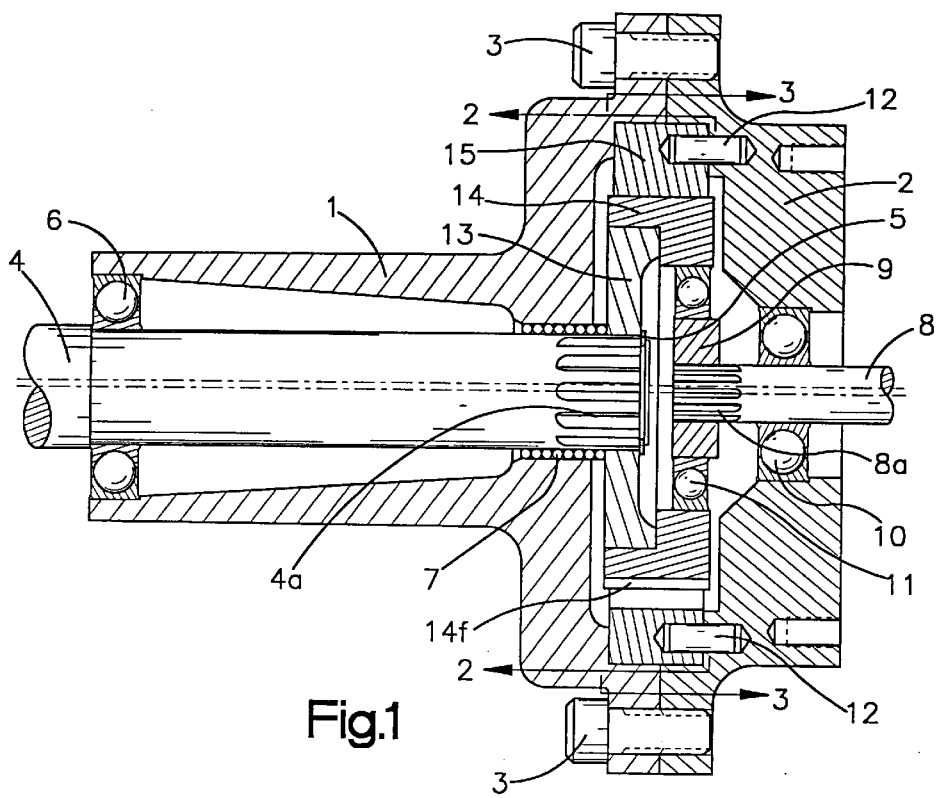
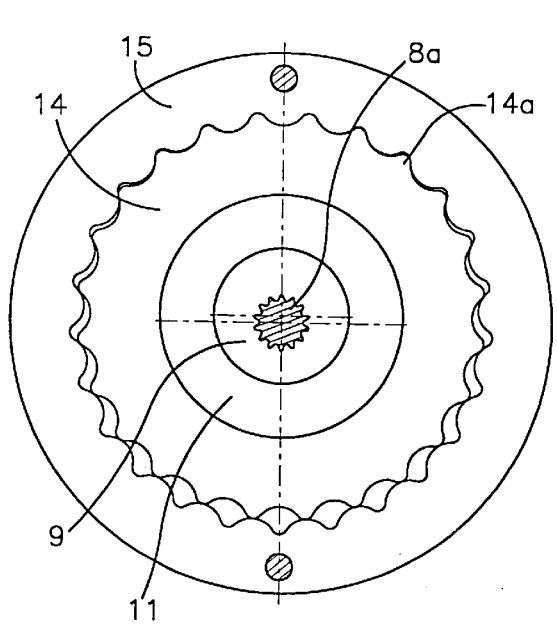
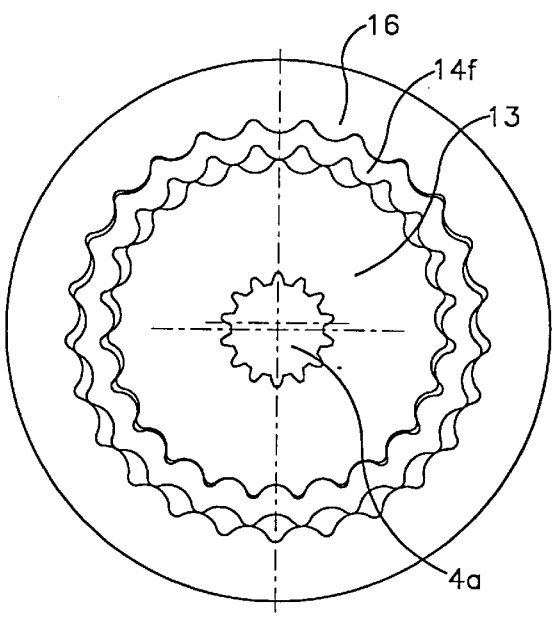
Fig.1
Fig.2
Fig.3

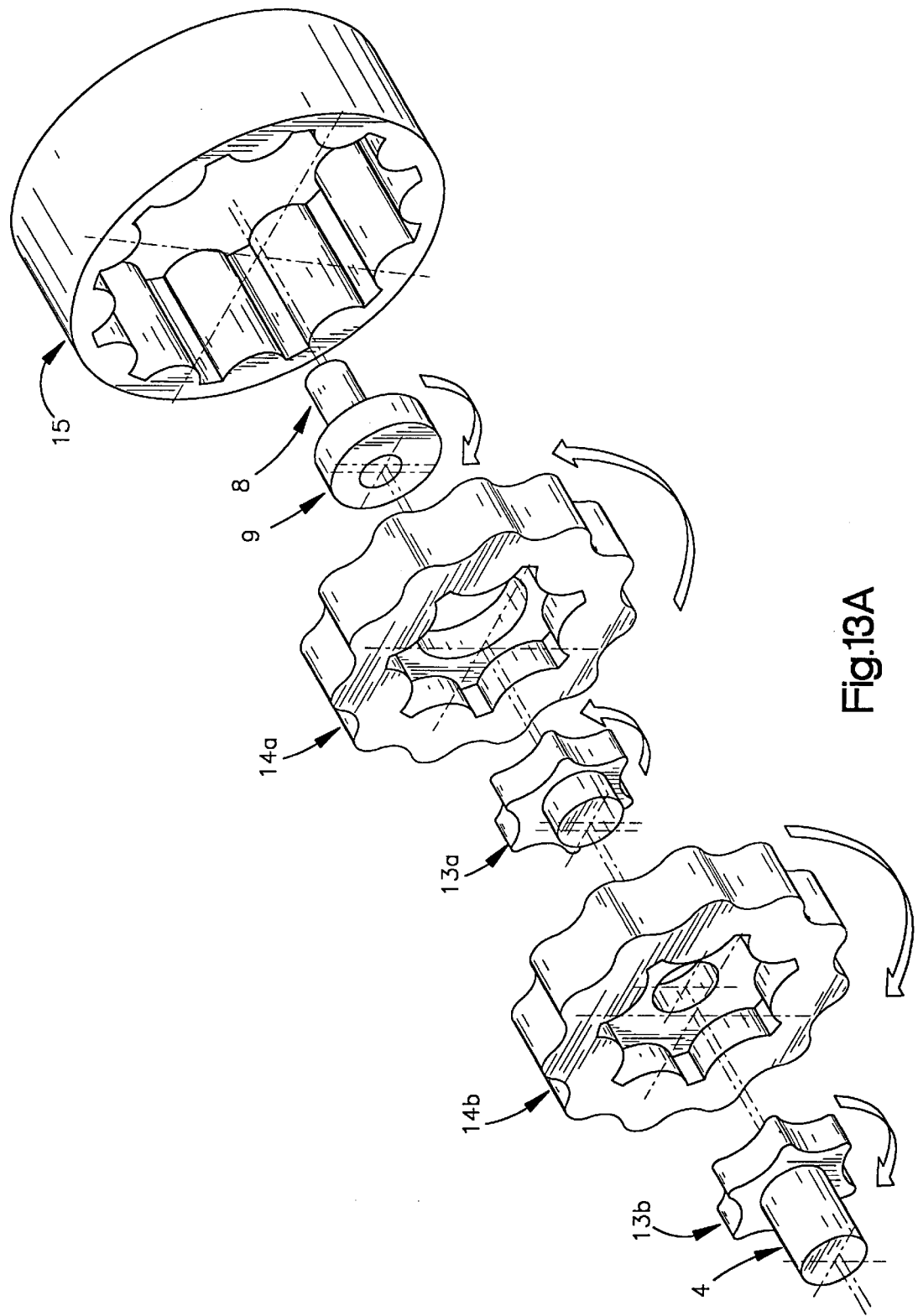

TROCHOIDAL TOOTH GEAR ASSEMBLIES FOR IN-LINE MECHANICAL POWER TRANSMISSION, GEAR REDUCTION AND DIFFERENTIAL DRIVE

FIELD OF THE INVENTION

The present invention pertains generally to mechanical power transmission and, in particular, to the use of meshed trochoidal tooth gears with the number of teeth of an inner gear being one less than an outer gear, for axially aligned velocity-reduced mechanical power transmission and gear reduction.

BACKGROUND OF THE INVENTION

Gear sets which have an inner gear with one less tooth than an outer gear, commonly known as "gerotors", have been in existence for about eighty years, patented in one form by Major Feuerheerd (U.S. Pat. No. 1,389,189) and refined by Myron F. Hill (U.S. Pat. Nos. 1,682,563; 1,833,993; 2,031,888; 2,389,728) and W. H. Nichols (U.S. Pat. Nos. 1,997,227; 1,997,228; 2,076,664) and many others. In gear sets of this type, the tooth shape of one of the gears generates a conjugate tooth shape of a cooperating gear and all of the teeth of one gear are in continuous contact with the teeth of the other gear with which it is meshed. The unequal number of teeth of the meshed gears form expanding and contracting chambers between the gear teeth as one gear is rotated and orbits about an axis eccentric to the other. For example, an externally toothed star or pinion gear mounted on a shaft and engaged eccentrically with an internally toothed ring gear rotates and orbits relative to the ring gear, thereby orbiting the expanding and contracting chambers between the gear teeth.

The recognized utility of this type of gearing is to displace gas or liquid through the expanding and contracting chambers, to provide a pump, or to hydraulically drive a shaft attached to such a gear. See, for example, U.S. Pat. Nos. 3,853,435; 3,910,732; 4,235,807; 4,569,644; 4,992,034 and 5,145,348. Typically, the gear tooth shapes of gerotors are trochoidal, i.e., defined by conjugate curves generated as functions of hypo- or epi-trochoidal orbit of one ratio circle of a rotor relative to another. This gear tooth geometry provides the necessary continuous wiping contact between the meshed gear teeth of the inner and outer rotor to create sealed chambers which expand and contract with rotation. Most applications of gerotors focus on the volumetric displacement of the chambers formed by the differing number of meshed gear teeth to perform pumping and fluid mechanical drive by valving ports to the orbiting expanding and contracting chambers to direct fluid flow or to hydraulically drive a gear set. See, for example, U.S. Pat. Nos. 2,076,664; 2,389,728; 3,853,435; 3,899,270, and 3,910,732. Fluid driven gerotors require commutator-type valving to direct flow to and from the expanding and contracting chambers of the gear rotors and a complete fluid circuit throughout the device which contributes greatly to the complexity and cost of such mechanisms. U.S. Pat. Nos. 2,240,874 and 4,569,644 disclose combinations of fluid driven gerotor gear sets with gear reduction. All of these described uses of gerotors rely on the fluid displacement characteristic to perform fluid moving or mechanical functions and do not provide alternatives to the traditional use of involute and planetary gearing for purely mechanical rotational power transmission and gear reduction.

Other types of gear systems employ gears in mesh with differing numbers of gear teeth, such as, for example, multiple axis planetary gear systems with involute gear teeth. U.S. Pat. No. 5,505,668 discloses a planetary gear system wherein a pinion has one tooth less than an internal gear, and the only contact between the pinion and the internal gear is in a crescent shaped area on one half of the meshed gears. Therefore, the described gear system does not employ the continuous contact type conjugate gear tooth forms characteristic of gerotors in a pure mechanical drive application.

SUMMARY OF THE INVENTION

The present invention provides trochoidal teeth gear assemblies for purely mechanical rotational axially aligned power transmission wherein internally meshed gears of the assemblies have differing numbers of conjugate trochoidal gear teeth which are in continuous contact. The differing number of teeth of the internally meshed gears produces gear reduction in axially aligned mechanical drive shafts. The invention allows an infinite variety of gear reduction ratios to be achieved in compact gear sets with fewer moving parts, bearings and required support structures. The continuous contact of the trochoidal tooth forms, defined by the path traced by the overextended radius of a generating ratio circle as it rotates without slipping about or within a mating ratio circle, provides greater distribution of stress through the meshed gear teeth (including reduction of shock loads and backlash), reduces vibration and facilitates lubrication. The described and claimed gear reduction and differential drive assemblies can be used in conjunction with any prime mover in any mechanical device requiring rotational driving at any desired speed or torque in any direction. A few non-limiting examples of applications of the various embodiments of the invention include wheeled vehicle propulsion, conveyor drive systems, as self-contained gear boxes combinable with any prime mover or in combination with a motor or engine, or for use in any electric or electro-mechanically driven device of any scale.

In accordance with one aspect of the invention, a trochoidal gear reduction assembly has three internally meshed gear rotors each with trochoidal gear teeth including, an internally-toothed stator; an externally-toothed coupling rotor having one less gear tooth than the stator and in mesh within the stator, the coupling rotor further having an axial opening for receiving an eccentric cam attached to a distal end of an input shaft which passes through the stator, and an axial internally-toothed opening; and an externally-toothed output rotor attached to a distal end of an output shaft and in mesh within the internally-toothed opening of the coupling rotor and having one less gear tooth than the internally-toothed opening in the coupling rotor for velocity-reduced axially aligned mechanical power transmission from the input shaft to the output shaft.

In accordance with another aspect of the invention, a trochoidal gear reduction assembly for providing axially aligned gear reduction from an input shaft to an output shaft includes an internally-toothed stator, an externally-toothed coupling rotor having one less gear tooth than the stator and in mesh within the stator, a cam mounted eccentrically upon a distal end of an input shaft which passes through the stator, the cam received in a concentric bore in the coupling rotor, an output coupler concentrically axially attached to a distal end of an output shaft and in contact with pins which extend axially from the coupling rotor into axial bores in the output coupler, the axial bores having a diameter greater than a diameter of the pins to allow the coupling rotor to induce velocity-reduced aligned axial rotation of the output coupler and output shaft.

In accordance with another aspect of the invention, a mechanical power transmission and reduction gear assembly includes meshed trochoidal teeth rotors axially mounted within a housing to transmit torque from an input shaft to an axially aligned output shaft. A rotor housing has a cavity with a generally annular internal opening for receiving an escapement element which has a generally annular outer perimeter and an internal array of trochoidal gear teeth, the escapement element further having a concentric axial bore for receiving a cam attached to an input shaft which passes axially through the housing, the escapement element further having axial bores positioned radially outside of the array of trochoidal gear teeth for receiving pins which extend axially from the internal opening of the housing, the axial bores of the escapement rotor having a diameter greater than the diameter of the pins of the housing whereby the escapement element is eccentrically mounted within the housing and allowed to orbit but not rotate within the housing, and an externally-toothed output rotor having a different number of trochoidal gear teeth than the escapement element in mesh with the internal array of gear teeth of the escapement element, the output rotor attached to an output shaft which remains in axial alignment with the input shaft as the escapement element eccentrically orbits within the housing to induce velocity-reduced rotation of the output rotor and shaft.

In accordance with still another aspect of the invention, a plurality of rotors having differing numbers of trochoidal gear teeth are internally meshed in series within stators about axially aligned input and output shafts to provide velocity-reduced mechanical drive. A stator includes an internal array of trochoidal gear teeth in mesh with an externally-toothed first output rotor, having one gear tooth less than the stator, and driven for orbital rotation within the stator by an eccentric cam on the end of an input shaft which passes through the stator. The first output coupler further includes an internal array of gear teeth in mesh with a first coupling rotor eccentrically mounted on a coupling shaft received in a second output coupler which also has external teeth in mesh with the stator. A second output coupler is in mesh with an internal tooth array of the second output rotor and attached to an output shaft in axial alignment with the input shaft.

And in accordance with still another aspect of the invention, a differential assembly for rotationally driving at least two axles at constant and different speeds includes a housing for receiving two axles journalled to rotate in axial alignment, a ring gear having external gear teeth in mesh with a drive shaft operable to rotate the ring gear about the axis of the axles, and internal trochoidal gear teeth, first and second coupling rotors mounted eccentrically 180° out of phase upon an eccentric shaft and having external trochoidal gear teeth in mesh with the internal teeth of the ring gear, the number of external teeth on the coupling rotors being different than the number of internal teeth of the ring gear, the first and second coupling rotors each having an internal array of trochoidal gear teeth in a projecting flange, and output rotors having external trochoidal gear teeth in mesh with the corresponding projecting flange, the output rotors having a different number of gear teeth than the number of gear teeth in the annular flange of the corresponding coupling rotor, each output rotor connected to an axle.

These and other aspects of the present invention are herein described in particularized detail with reference to the accompanying Figures.

BRIEF DESCRIPTION OF THE FIGURES

In the accompanying Figures:

FIG. 1 is a cross-section of a dual rotor trochoidal gear reduction assembly in accordance with the present invention;

FIG. 2 is an end view of the gear assembly of FIG. 1 in the direction of the arrows 2—2;

FIG. 3 is an end view of the gear assembly of FIG. 1 in the direction of the arrows 3—3;

FIG. 13A is a perspective view of a series of mechanically driven trochoidal gears in accordance with the present invention;

DETAILED DESCRIPTION OF PREFERRED AND ALTERNATE EMBODIMENTS

Figure 4:
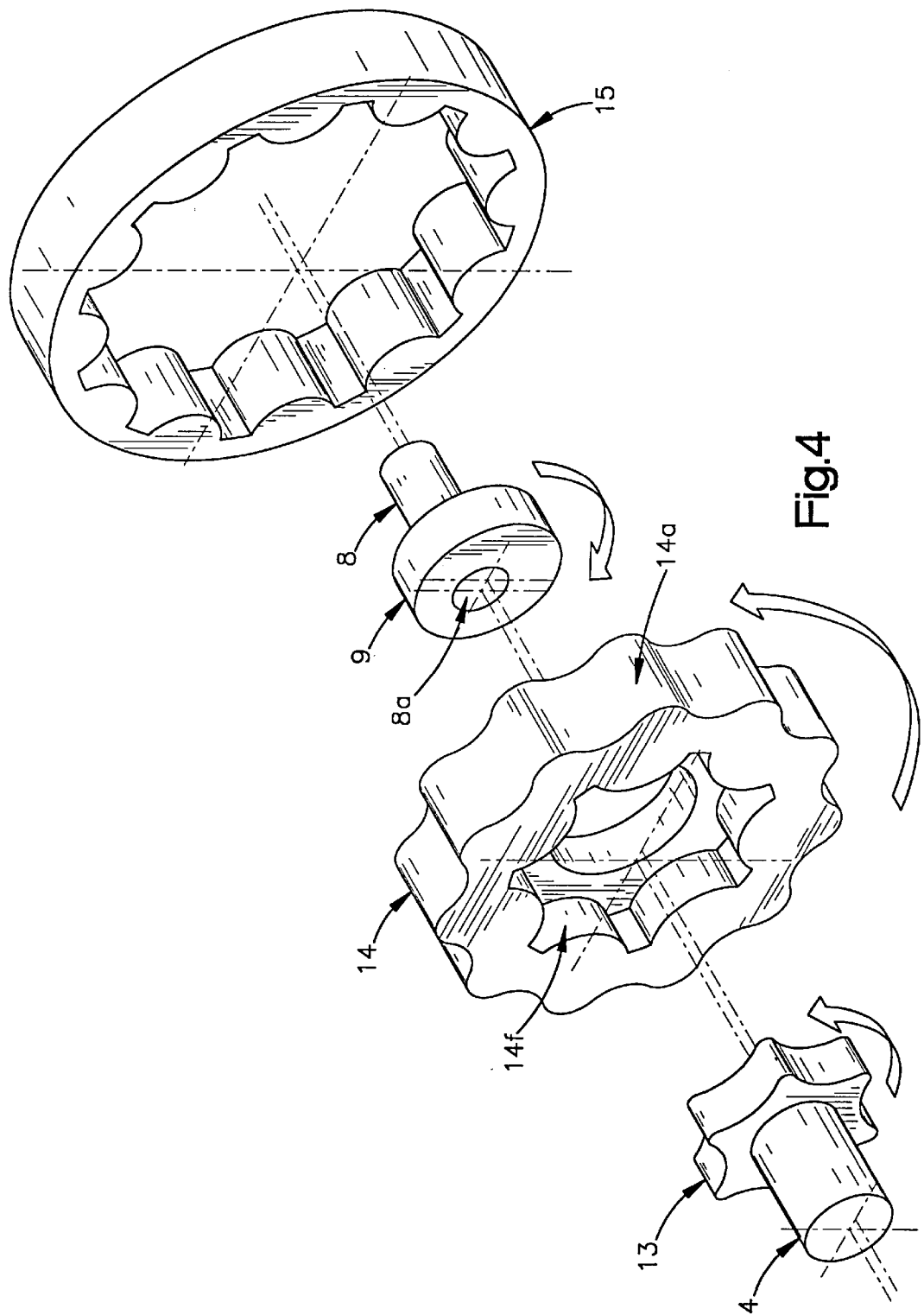
FIG. 4 is a perspective view of the trochoidal gears, cam and shafts of the gear assembly of FIG. 1.

FIG. 1 through 4 illustrate one embodiment of a dual rotor trochoidal gear reduction assembly of the invention wherein a rear housing 2 supports an input shaft 8 which is rotationally driven by any suitable torque generator. In fact, each of the various embodiments of the invention can be used in connection with or made integral with any prime mover such as, for example, electric motors, variable speed motors, hydraulically driven motors, internal combustion engines, and turbine engines. A distal end 8a of input shaft 8 is splined for eccentric attachment to a cam 9 as shown in cross-section in FIG. 2. A cam follower bearing 11 fits on the outer perimeter of cam 9, and an externally-toothed trochoidal coupling rotor 14 fits over cam follower bearing 11.

The conjugate curved tooth profile of the trochoidal teeth of coupling rotor 14 are generated by the corresponding trochoidal tooth form of an internally-toothed stator 15. Coupling rotor 14 is in mesh with stator 15. Stator 15 is fixed to the rear housing 2 by pins 12 or other suitable fastening means. The trochoidal profile of the gear teeth of stator 15 provide the generating tooth form which dictates the conjugate curve of the trochoidal tooth profile of the teeth of coupling rotor 14. The eccentricity of input cam 9 is selected according to desired design parameters and will influence the overall size of the gear set, i.e., the displacement depth between the teeth of stator 15. In general, the tooth depth of the generated tooth form of coupling rotor 14 is equal to twice the eccentric, and the ratio circle radius is equal to the number of teeth of the coupling rotor times the eccentric. These fundamental relationships between the gear teeth of the gears are the same in each of the different embodiments of the invention.

As used herein, the term "trochoidal" means the gear tooth profile shapes of the gear teeth of the rotors as generated by the circular tooth profile on the generating ratio circle, following the path of a trochoid to create the conjugate tooth forms on the mating gear as a function of the ratio circles. Trochoidal tooth profiles can be generated as either hypo- or epi-trochoids. There are only certain types of trochoids which can be used, namely those resulting from an overextended radius of a generating ratio circle which rolls about a mating ratio circle without slipping. There is also a minimum requirement for this extended radius which is a function of the number of teeth and the generating radius. The prefixes "epi" and "hypo" can be applied to the term trochoid to define whether a trochoid is generated by an outer ratio circle or an inner ratio circle, respectively.

As shown in FIGS. 2, 3, 6, 7, 11, 15, 16 and 18, in the internally-meshed trochoidal gear tooth sets of the invention, all of the meshed gear teeth are in continuous contact about the entire peripheries of the gears, with only minimum clearance adequate to allow the described rotational orbiting motion. Therefore, as used herein, the term "contact" or "continuous contact" includes all of the relative positions of the meshed gear teeth from fully engaged and driving the gear teeth of a cooperating gear, to the close passing of gear tooth tips of cooperating gears in the described rotational/orbital motion. In other words, as the gear teeth of one rotor pass over the gear teeth of the other, they remain in at least surface contact throughout 360° of the meshed gear teeth arrays even though some minimum degree of clearance is necessary to allow the relative motion of the gears.

As further shown in FIGS. 1–4, an externally-toothed output rotor 13 is in mesh with a projecting internally-toothed flange 14f of coupling rotor 14. The internal teeth of flange 14f of coupling rotor 14 provide the conjugate generating form for the teeth of output rotor 13. A central splined bore 13a of output rotor 13 is engaged upon a distal end 4a of an output shaft 4, supported for axial rotation upon bearing sets 6 and 7 mounted within a front housing 1. The front housing 1 is bolted to the rear housing 2 by bolts 3. The axial alignment of input shaft 8 with output shaft 4 through the described gear reduction assembly is particularly advantageous in most engineering applications. Axial alignment of input and output shafts simplifies gear housing geometry and drive line design parameters, minimizes torque reduction and gear component stresses, and minimizes the number of required bearings.

Although these and other embodiments of the invention are described with reference to trochoidal gear tooth shapes, it is within the scope of the invention that any suitable gear tooth shape or profile which can be made to mesh in continuous contact with conjugate gear teeth, wherein an inner gear has a different number of teeth than a meshed outer gear, could be employed to achieve the described axially-aligned mechanical power transmission and gear reduction, and to obtain the described mechanical advantages, including but not limited to improved distribution of force through gears or rotors, reduced friction, internally-meshed engagement of inner and outer rotors in a single plane to perform gear reduction in a compact space, and the ability to be backdriven. One alternate embodiment of conjugate trochoidal gear tooth forms is described below with reference to FIG. 18. All of the trochoidal toothed gears of the invention can be made of any material suitable for the application, including but not limited to metal, including fine metal stamping; powdered metal; wrought, heat-treated and/or ground steel; plastics and polymers; or any other material which can be formed to the trochoidal tooth profiles.

With some means to drive the input shaft 8, this gear system will run in either direction with the output shaft 4 rotating in the opposite direction of and in axial alignment with input shaft 8. As input shaft 8 is rotated, cam 9 induces eccentric orbital opposite rotation of coupling rotor 14 within stator 15. The internal teeth of coupling rotor flange 14b induce orbital rotation in the same direction of output rotor 13 within coupling rotor 14 at a rotational speed reduced from that of input shaft 8 according to the gear teeth relationships described below.

To determine the different reductions possible with this embodiment of the invention, let "N" equal the number of teeth of the stator 15 and "n" equal the number of teeth on the internally-toothed flange 14b of coupling rotor 14. The ratio of the input shaft 8 rotation to the output shaft 4 (the gear ratio) is thus:

$$\frac{\text{Input}}{\text{Output}} = \frac{1-N}{1+\frac{N}{n-1}} = \omega_r$$

The described preferred embodiments of the gear reduction assemblies of the invention use gear sets with $n \leq N+1$. Nonetheless, the many possible combinations of gear ratios, including the outer rotor (stator) having more teeth than the inner rotor by more than one, and the inner rotor having more teeth than the outer rotor (n>N) are all within the scope of the invention. However, both gears of a set must be generated on the same eccentric and the gear ratio (pitch) circles are proportional to the number of teeth in the gear; hence, should the ratio circle of the inner gear be much larger than the ratio circle of the outer gear, a problem may exist in the requirements of the extended radius, and undesirable tooth profiles may result. Table I sets forth an array of gear ratios possible with this system and in accordance with the general gear reduction principles of the invention.

With respect to the relative motion of the individual elements of this gear reduction unit, the following relationships exist.

Cam (9) vs. Cam follower (11)

The speed ratio here is −1:1 and at high speeds, high friction loads would be involved, possibly requiring the use of an anti-friction bearing.

Coupling rotor (14) vs. Stator (15)

In this case, we have a sliding action of line contact and relatively lower velocity of the coupling rotor 14, which would result in much lower friction levels. The input shaft and cam must rotate through (360×(1/N−1) degrees to produce 360×1/N degrees of rotation for the coupling rotor 14. In other words, owing to the nature of the internally meshed gear sets having differing numbers of teeth, and the trochoidal profile of the tooth form, the lines of contact of each of the teeth of the meshed gears slide in parallel contact against the conjugate tooth surfaces of the other gear, distributing the torque throughout all of the gear teeth and resulting in less concentration of stress and friction than the rolling tangential contact of involute-type gear teeth.

Output rotor (13) vs. Coupling rotor (14)

The sliding action is the same as discussed above and for each revolution of the coupling rotor, the output rotor 13 will have N/n−1 revolutions relative to the coupling rotor 14. A specific example is set forth below, wherein:

$\omega_R = -12:1$
N=25 (or N=26)
n=26 (or n=25)
Input=1200 rpm then cam 9 vs. cam follower 11 $\omega_R = -1:1$
Input=output=−1200 rpm.

Coupling rotor (14) vs. Stator (15)

$$\omega_R = \frac{1}{1-N}$$

$$-1200 \text{ RPM} \times \frac{1}{1-25} = 50 \text{ RPM}$$

Output rotor (13) vs. Coupling rotor (14)

$$\omega_R = \frac{N}{n-1}$$

$$50 \text{ RPM} \times \frac{25}{26-1} = 50 \text{ RPM}$$

Output shaft (4) vs. Input shaft (8)

$$\omega_R = \frac{1-N}{1+\frac{N}{n-1}}$$

$$-1200 \text{ RPM} \left(\frac{-24}{1+\frac{25}{25}}\right)^{-1} = 100 \text{ RPM}$$

A 12:1 gear reduction from input shaft 8 to output shaft 4 is thus achieved by the differing number of teeth of the external and internal tooth arrays of the coupling rotor 14 relative to the stator 15 and the output rotor 13. This particular embodiment provides the structural advantages of axial alignment of the input and output shafts and a single compact support structure in the form of the stator for both the coupling and output rotors. This aspect of the invention simplifies the design of the gear housing and minimizes the number of required support structures and bearings to thereby reduce the production cost of a gear reduction unit in accordance with the invention. The gear sets of the invention can be lubricated by any suitable well known means such as gear lubrication held within the housing or lubrication pumped from an associated engine.

Single Rotor Trochoidal Gear Reduction Assembly

Figure 5:
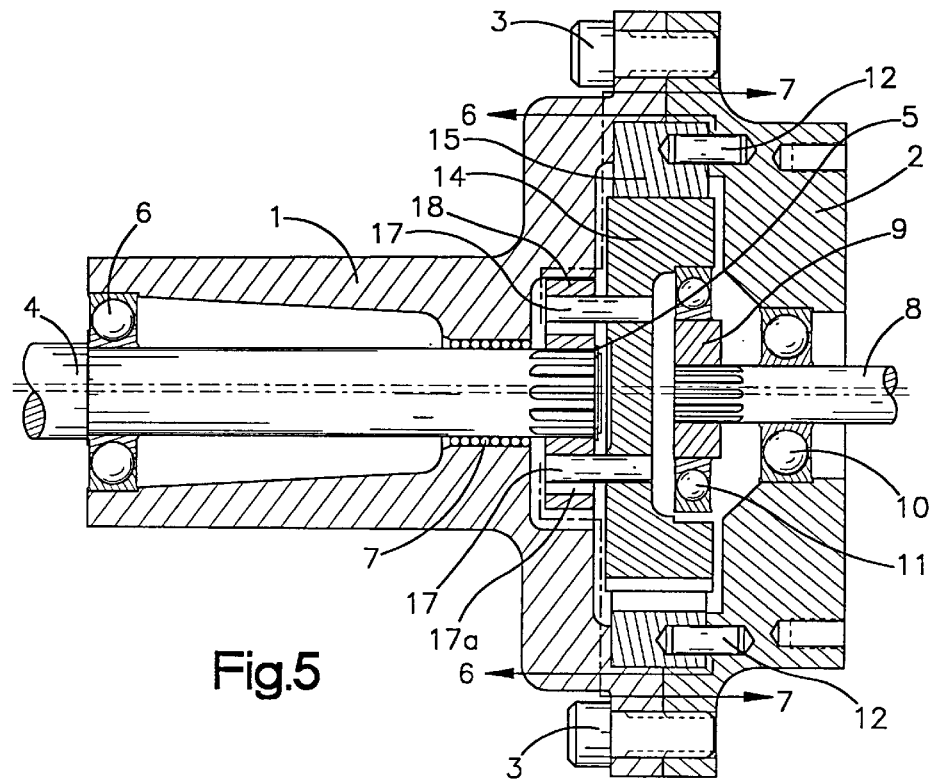
FIG. 5 is a cross section of a single rotor trochoidal gear reduction assembly in accordance with the present invention.
Figure 6:
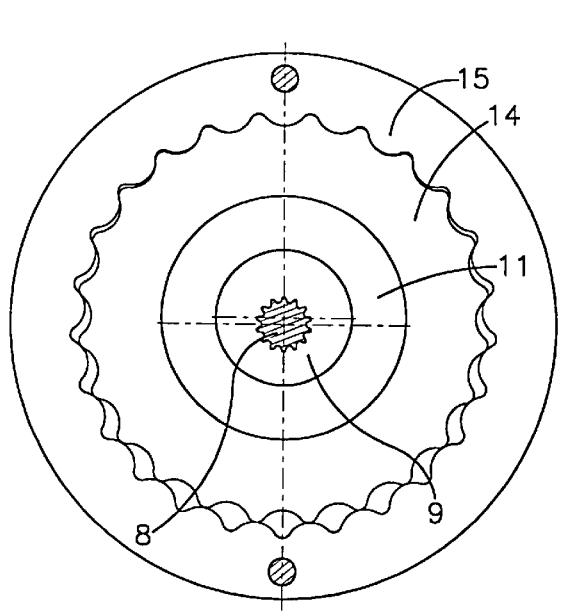
FIG. 6 is an end view of the gear assembly of FIG. 5 in the direction of the arrows 6—6.
Figure 7:
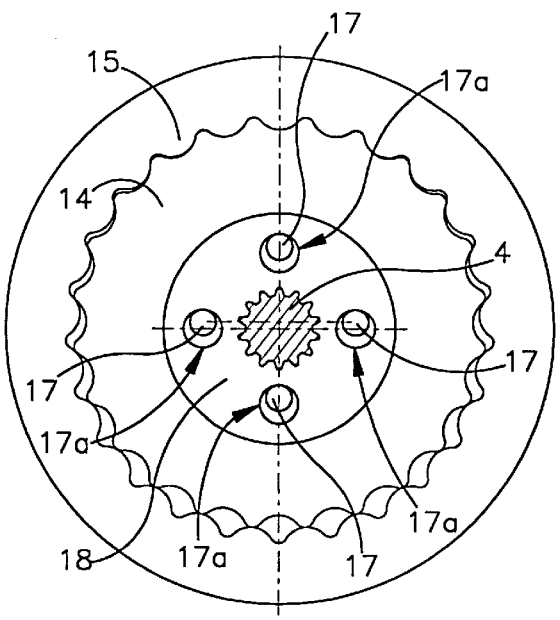
FIG. 7 is an end view of the gear assembly of FIG. 5 in the direction of the arrows 7—7.
Figure 8:
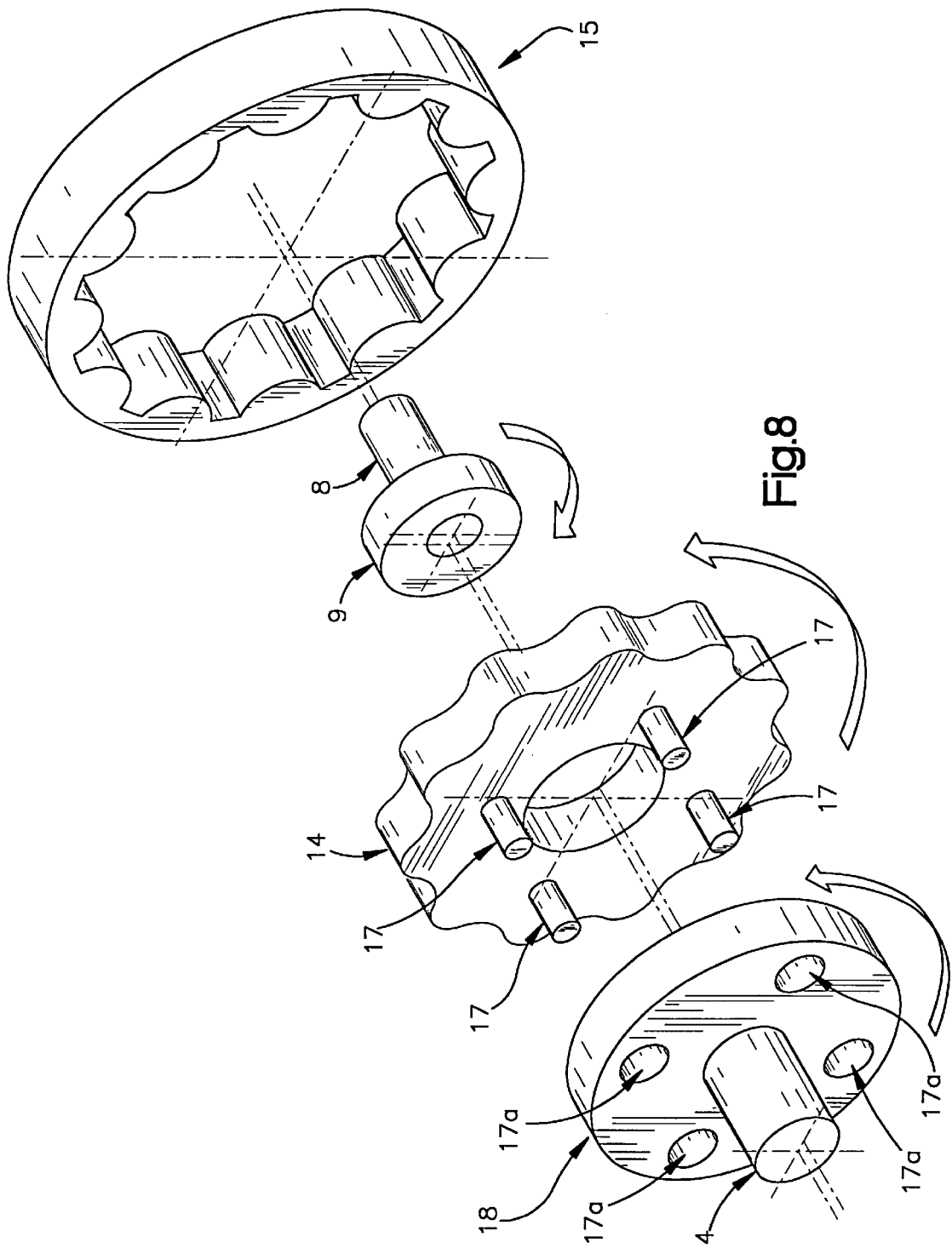
FIG. 8 is a perspective view of the trochoidal gears, input cam, output coupling and shafts of the gear assembly of FIG. 5.
Figure 9:
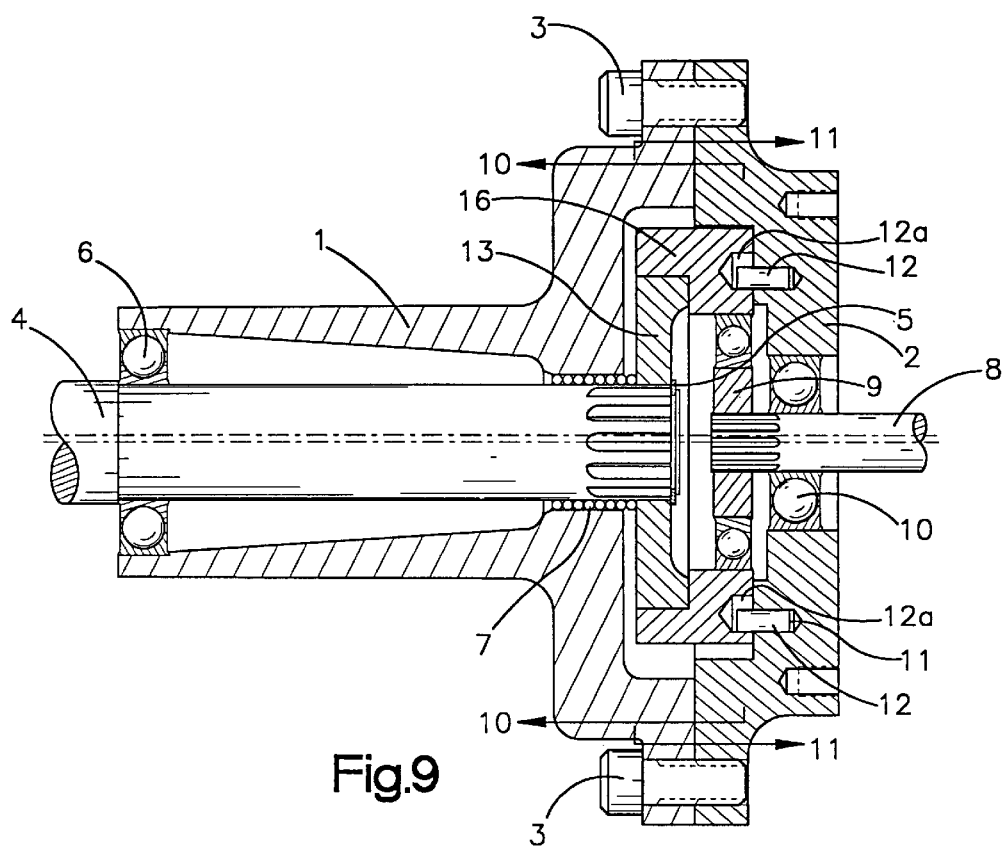
FIG. 9 is a cross-section of an alternate embodiment of a single rotor trochoidal gear reduction assembly in accordance with the present invention.
Figure 10:
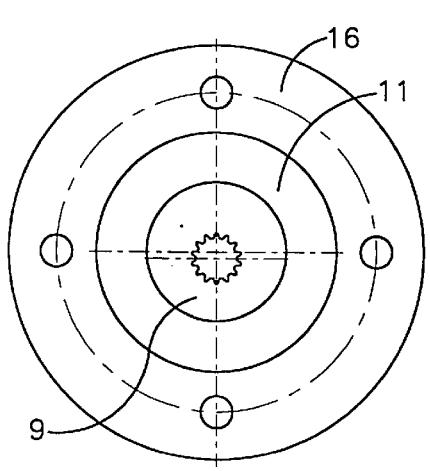
FIG. 10 is an end view of the gear assembly of FIG. 9 in the direction of the arrows 10—10.
Figure 11:
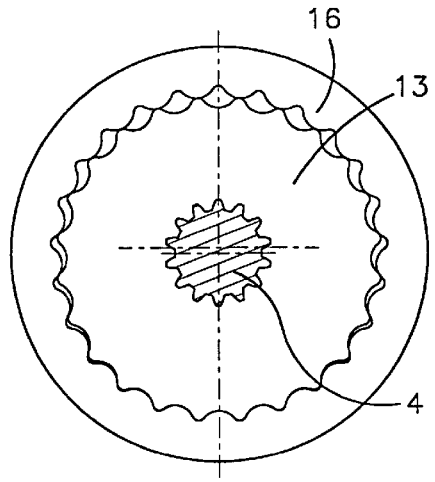
FIG. 11 is an end view of the gear reduction assembly of FIG. 9 in the direction of the arrows 11—11.
Figure 12:
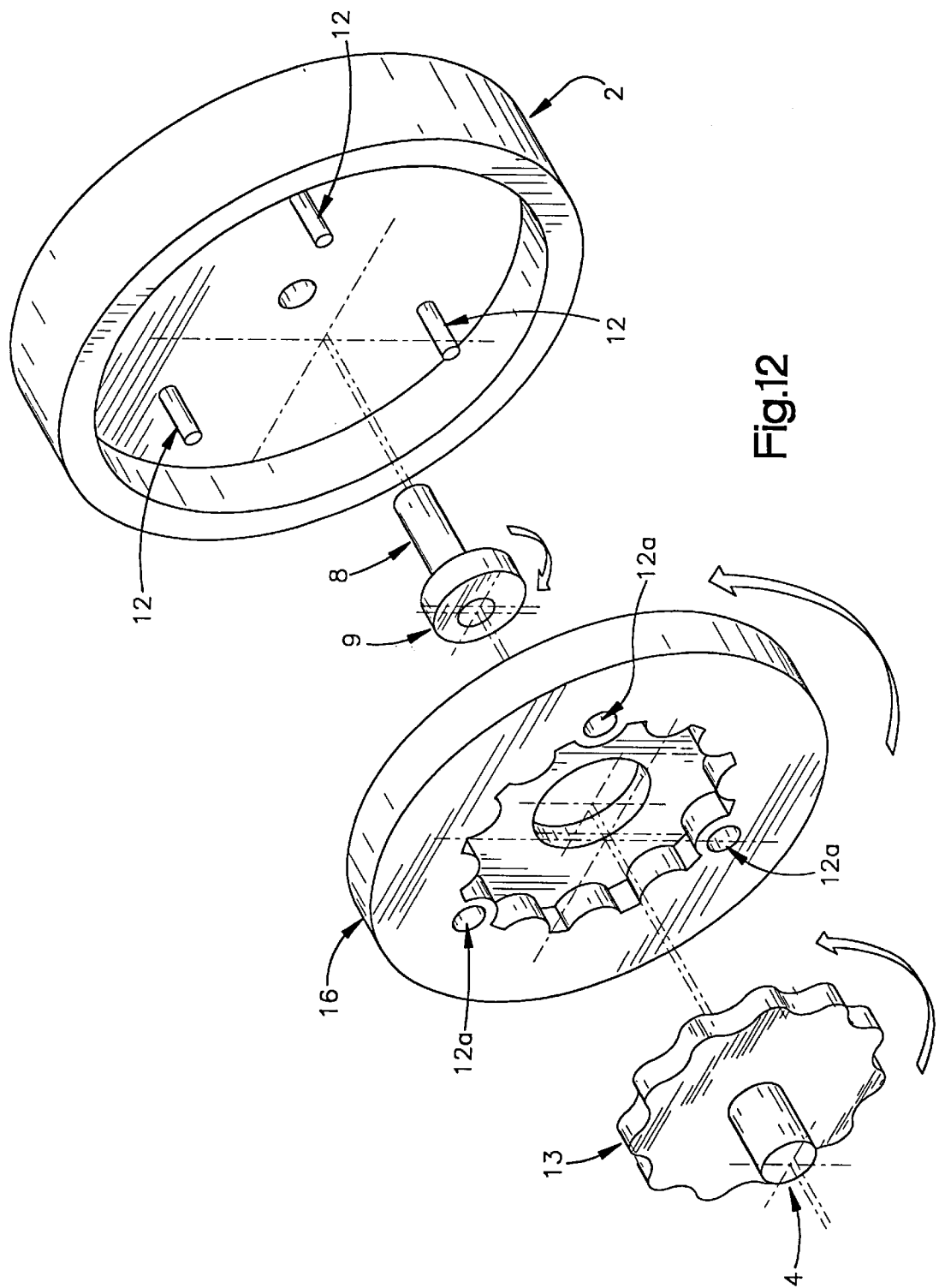
FIG. 12 is a perspective view of the rear housing, rotors, input cam and shafts of the gear reduction assembly of FIG. 9.

Referring now to FIGS. 5 through 8, there is depicted a single rotor trochoidal gear reduction assembly substantially similar to that of FIGS. 1–4 but with an output coupler 18 in place of output rotor 13. As shown in FIG. 5, output coupler 18 is eccentrically mounted upon pins 17 which project axially from the coupling rotor 14 and are received in oversized holes 17a in the output coupler. This arrangement allows the orbiting coupling rotor 14 to impart rotation about the common axis to the output coupler 18 which is attached (for example by splined engagement or other suitable attachment) to the output shaft 4. The configuration of the coupling rotor 14 is simplified by the absence of the internally-toothed projecting flange 14f shown in FIG. 4. As input shaft 8 is rotated in one direction, cam 9 induces orbital opposite rotation of coupling rotor 14 within stator 15. Pins 17 impart the orbital and rotational motion of coupling rotor 14 to output coupler 18. Oversized holes 17a allow output coupler 18 to rotate about the axis of output shaft 4, aligned with input shaft 8.

In the embodiment of FIGS. 5–8, the gear ratio is: $\omega_R = 1-N$. For any given ratio, the relative speed is increased and the overall assembly becomes smaller. In general, fewer teeth upon coupling rotor 14 and stator 15 will allow the components to be dimensioned to a smaller diameter with faster rotation. Eccentric bushings or bearings mounted in the output coupler 18 to receive pins 17 could be used in place of holes 17a.

FIGS. 9–12 illustrate another embodiment of a single trochoidal gear reduction assembly similar to that of FIGS. 5–8 but with an escapement element 16 in place of stator 15 and coupling rotor 14. The escapement element 16 is driven by input cam 9 and cam follower 11 to orbit but not rotate within rear housing 2. This is accomplished by eccentrically mounting the escapement element 16 upon pins 12 received in oversized holes 12a to allow orbiting without rotation. Holes 12a are equal to the size of pins 12 plus two times the eccentric of cam 9. As explained above, eccentric bushings or bearings could be used in leiu of oversized holes 12a. Accordingly, rotation of cam 9 induces eccentric orbiting of escapement element 16 which imparts rotation to output rotor 13 which is spline-engaged with output shaft 4. The gear ratio and relative velocities are the same as the embodiment of FIGS. 5–8.

In this arrangement, wherein:

$\omega_R = -12:1$
N=13
input=1200 RPM then Cam (9) vs. Cam follower (11) $\omega_R = -1:1$
input=output=−1200 RPM.

Output rotor (13) vs. Escapement (16)

$\omega_R = 1-N$ $$\omega_R = 1 - N$$

$$-1200 \text{ RPM} \times \frac{1}{1-13} = 100 \text{ RPM}$$

This would be the same for output shaft (4) vs. input shaft (8).

Connecting Trochoidal Gear Reduction Sets in Series

Figure 13B:
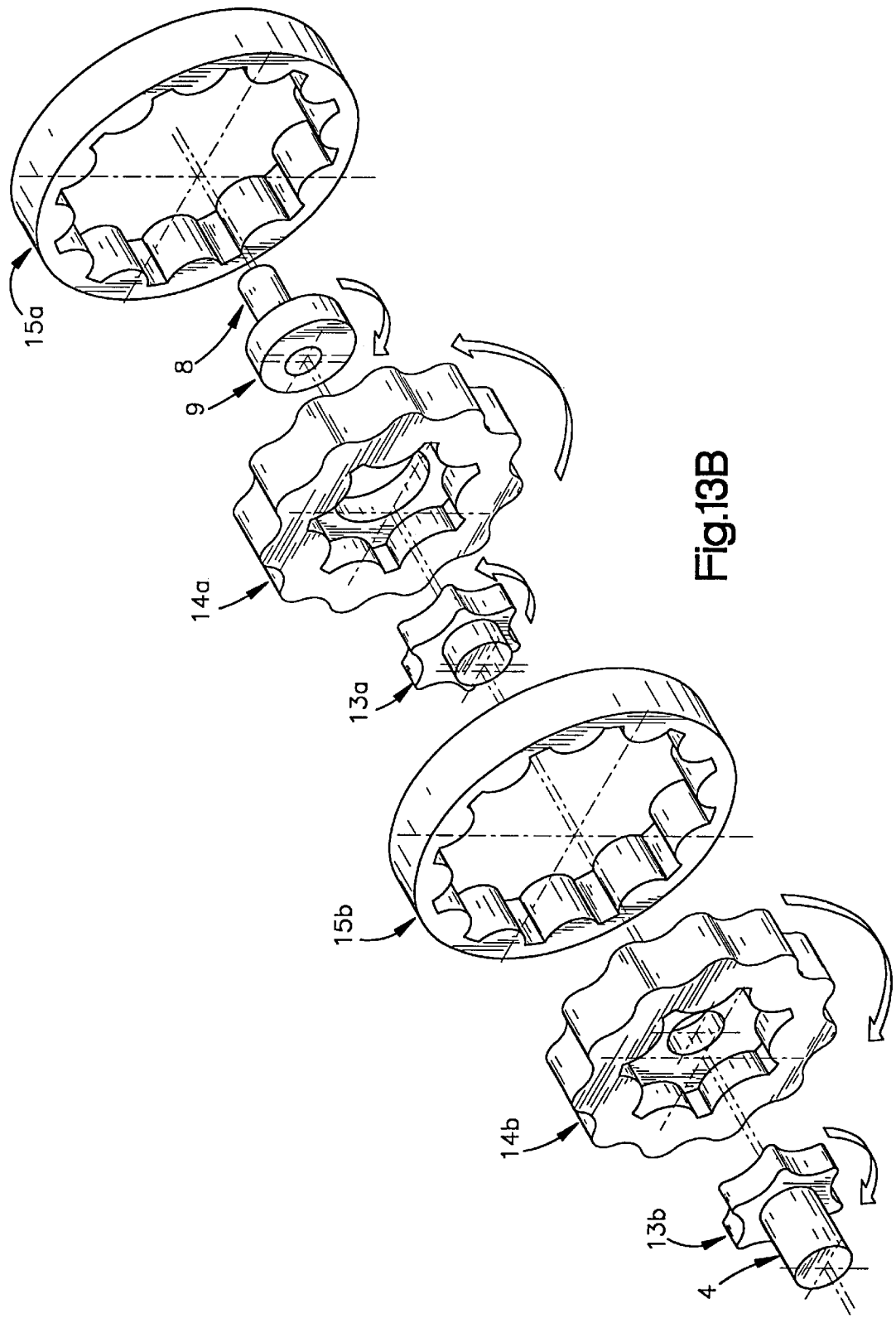
FIG. 13B is a perspective view of an alternate embodiment of a series of mechanically driven trochoidal gears in accordance with the present invention.

Combinations of any of the three above-described gear reduction concepts (FIGS. 1–4 representing concept α, FIGS. 5–8 representing concept β, and FIGS. 9–12 representing concept γ) can be made to achieve gear reduction ratios. For example, as illustrated by FIG. 13A, two coupling rotors 14a and 14b are connected in series by corresponding output rotors 13a and 13b, with coupling rotor 14a driven by eccentric cam 9, and the output shaft 4 driven by output rotor 13b. Both coupling rotors 14a and 14b can be in mesh with the internal teeth of stator 15. Alternatively, each coupling rotor 14a and 14b can be in mesh with its own corresponding stator 15a and 15b as shown in FIG. 13B, with the same or different teeth ratios to achieve different gear reduction ratios. The output of each reduction set is axially aligned with the input to the next set in the series. Although not required, employing the same eccentric through a series combination of sets may in some cases provide desirable advantages as discussed below.

The possibilities for combining the three different concepts, $\alpha$, $\beta$ and $\gamma$ are many. Let Z represent the number of different concepts. If we have Z different reduction concepts, and we wish to combine two sets in series, then the following combinations are possible:

Z(2n–1).

With the three different concepts, fifteen (15) combinations are possible: 3×(2×3–1)=15.

In accordance with the invention it is possible to link more than two sets in series subject to required housing and support bearing constraints. For any such combinations, the basic combinations outlined above would still prevail. Combinations of the different reduction concepts in series has a profound effect on the possible gear ratios. The final gear ratio for N number of sets employed is the algebraic product of the individual reduction ratios:

$$\omega_R^{Total} = \omega_R^1 \times \omega_R^2 \times \ldots \omega_R^N$$

To illustrate this, consider the following example: select three identical a reduction sets with $\omega_R$=–10:1. In this case, the final gear ratio would be $$\omega_R^{Total} = -10 \times -10 \times -10 = -1000:1$$

Notice that for an even number of sets, positive input rotation results in positive output rotation. Odd numbers of sets produce negative output rotation.

All of the earlier discussion regarding the individual reduction concepts applies to them when placed in a series combination and when used in the final output/driven position. When placed in an intermediate position, there are certain constraints and/or requirements that must be satisfied. Each intermediate output rotor must provide pure rotation about the common axis and be able to drive the intermediate eccentric for the next set in the series. Concepts $\alpha$ and $\gamma$ will satisfy this requirement, but may require support from the housing. Concept $\beta$ requires use of a flexible connection as described or a dogbone or universal joint supported by the housing Concept $\alpha$ (FIG. 12) offers some advantages over concepts $\beta$ and $\gamma$. Since the output shaft rotation requirement is innately satisfied, an eccentric shaft connection would allow close juxtaposition between reduction sets resulting in space savings and fewer support devices. Furthermore, if all eccentrics are kept the same, then one stator could be used to serve all of the reduction sets in a series. It would not be necessary for all of the reduction sets to have the same gear ratio since the coupling rotors could all be different. The net result would be a very compact assembly. The overall reduction ratios available are nearly infinite, limited only by practical limitations.

Concept $\gamma$ satisfies the output shaft requirement; however, it cannot use a common escapement element because of the counter rotation effect. This results in individual escapements for all $\gamma$ reduction sets in a series, all of which must be supported by the housing.

When working on any given application, all of the available combinations, along with their advantages and disadvantages, should be considered to prevent missing an opportunity. In a series application, the $\alpha$ reduction set is such a strong contender for the driving position, the desirable combinations seem to drop from 15 to 3.

Differential Concept Employing Trochoidal Gears

Figure 14:
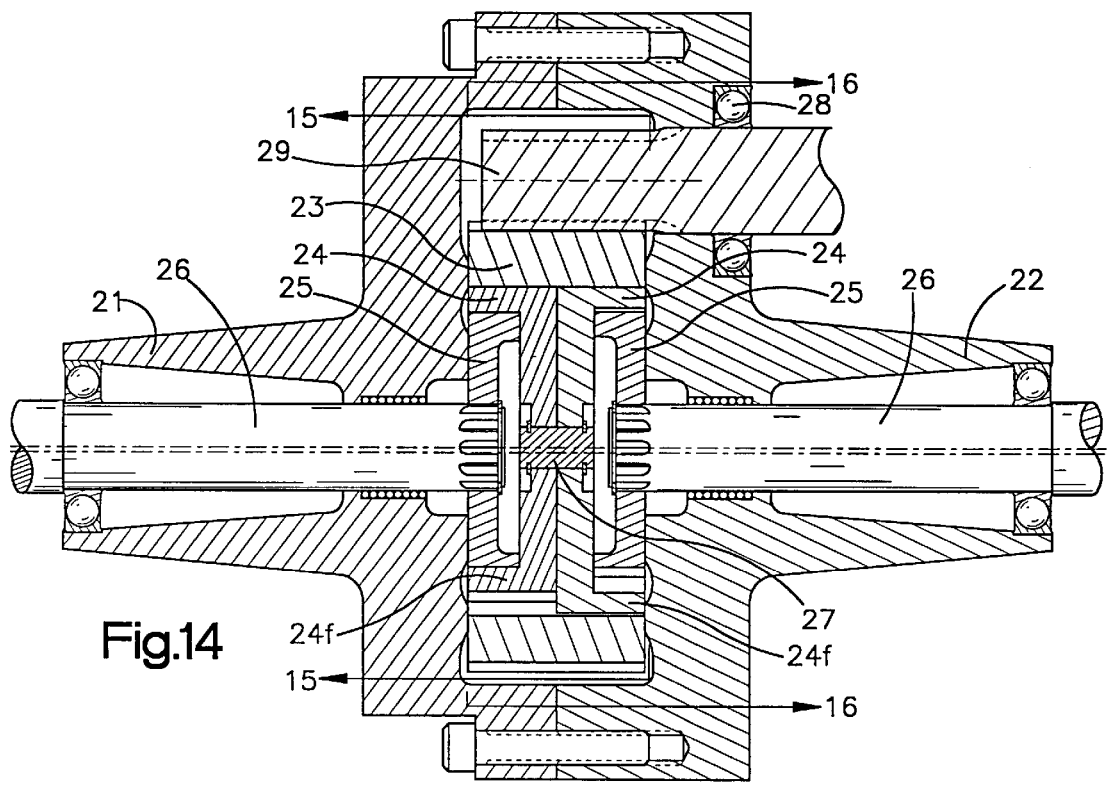
FIG. 14 is a cross-section of a trochoidal gear differential assembly in accordance with the present invention.
Figure 15:
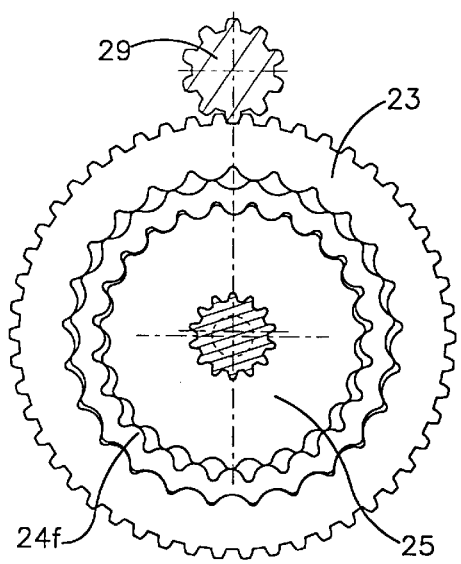
FIG. 15 is an end view of the differential assembly of FIG. 14 in the direction of the arrows 15—15.
Figure 16:
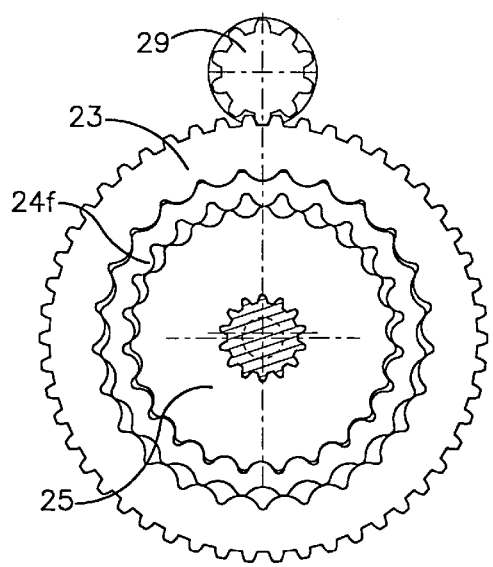
FIG. 16 is an end view of the differential assembly of FIG. 14 in the direction of arrows 16—16.
Figure 17:
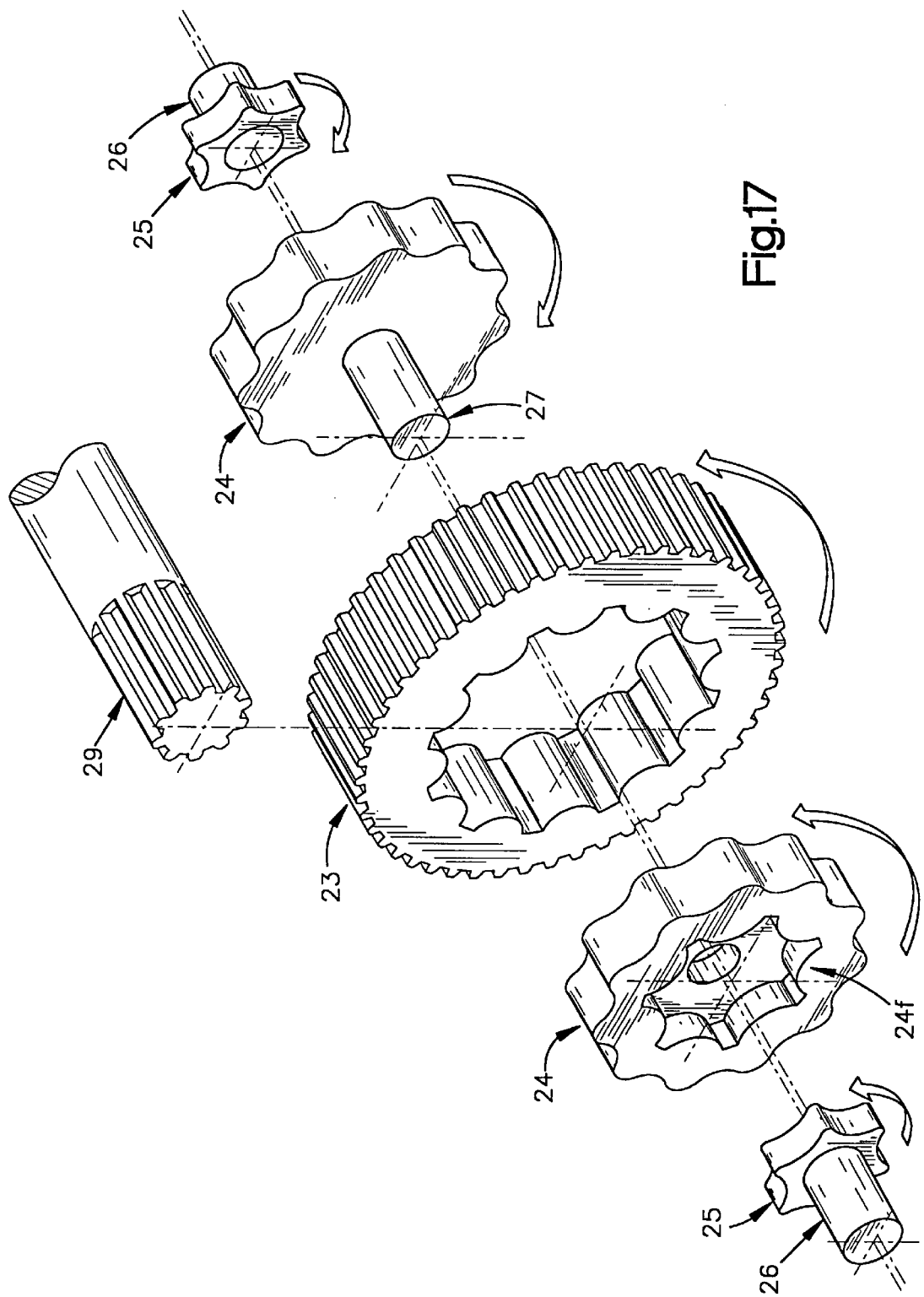
FIG. 17 is a perspective view of the trochoidal gears and shafts of the differential assembly of FIG. 14.

FIGS. 14 through 17 illustrate a transaxle differential gear assembly which utilizes opposed trochoidal gears meshed 180° out of phase in a single ring gear in accordance with another embodiment of the invention. In this concept, a variation of the dual rotor concept of FIG. 1, the stator is replaced by a driven ring gear 23 which has an internal array of trochoidal teeth which provide the generating form for the conjugate trochoidal tooth profiles of the external gear teeth of symmetrical coupling rotors 24. The coupling rotors 24 are placed back-to-back and eccentrically connected 180° out of phase within the ring gear by an eccentric coupling shaft 27. The coupling rotors 24 can only move in counter-rotation to each other at equal angular velocities within the ring gear. An annular flange 24f on each coupling rotor 24 has an internal array of trochoidal gear teeth which provide the generating tooth form for the conjugate trochoidal teeth of output rotors 25. The output rotors 25 are attached concentrically by splined or other suitable engagement with output shafts/axles 26 and run in mesh with coupling rotors 24. The two output shafts/axles 26 and the coupling shaft 27 are journalled in axial alignment within the assembly housing halves 21 and 22 as shown in FIG. 14.

One application of the trochoidal gear differential assembly would be, for example, to the drive axle of a vehicle or other machine, with wheels or rotating members attached to the output shafts 26 which serve as the drive axles. With rotational power applied to an input drive shaft 29 which is journalled to rotate within bearings 28 and spline engaged with the external teeth of ring gear 23, ring gear 23 is rotated about the common axis of the output shafts 26. With the vehicle moving in a straight line normal to the axis of the gear assembly, and considering the fact that the coupling rotors 24 are 180° out of phase and can only rotate in opposite directions, the entire assembly, including ring gear 23, coupling rotors 24, output rotors 25 and output shafts 26, rotates as one mass and power is transmitted equally to output shafts 26. The differential effect comes into play should the vehicle be caused to turn. In this situation, the wheel on the inside of the turn would slow down while the other wheel would speed up, this being the result of the counter rotation feature of the coupling rotors 24. This embodiment thus provides a smooth trochoidal gear tooth differential transaxle drive assembly which performs the required function of differential axle speeds.

Figure 18:
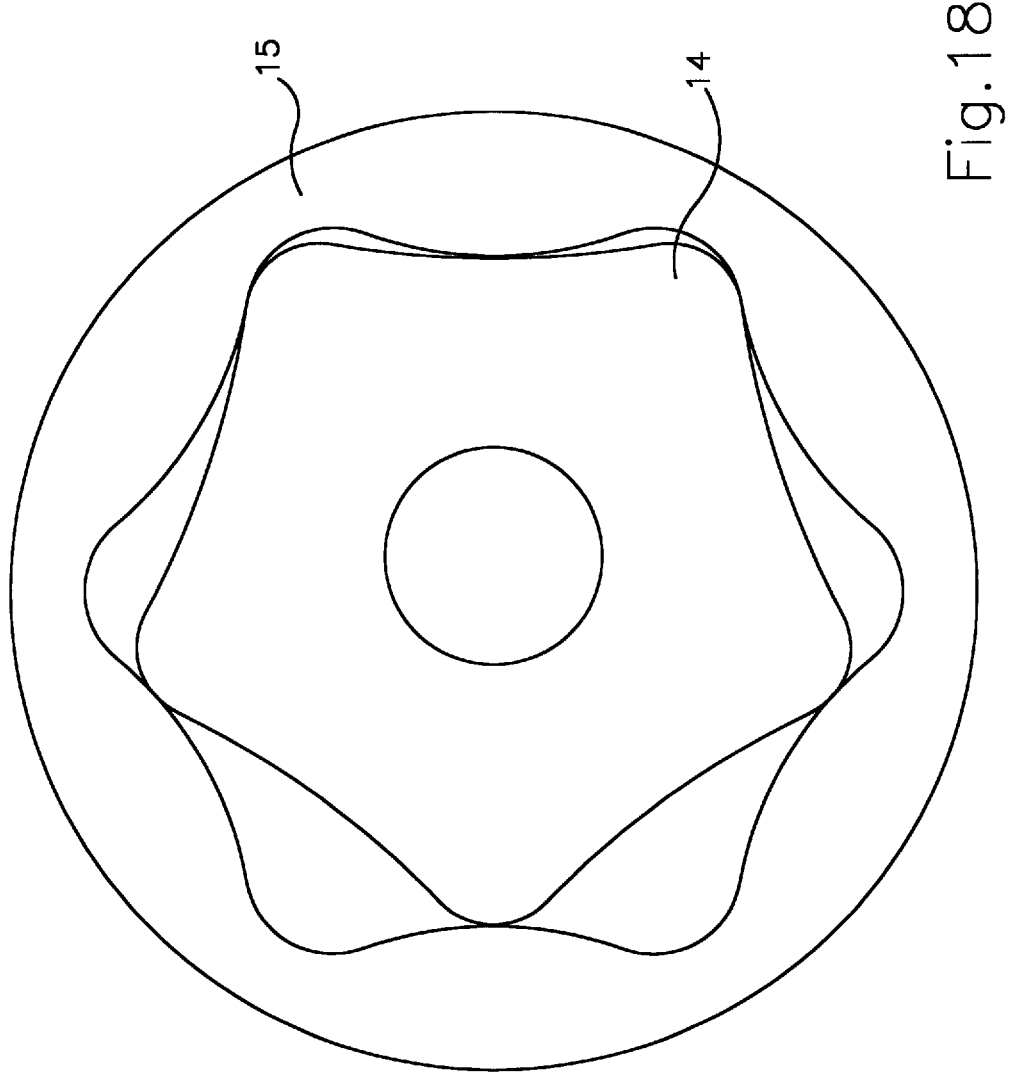
FIG. 18 is a cross-section of a hypo-trochoidal gear set of the invention.

Any of the gear sets and combinations of gear sets of the invention, having at least one internally toothed stator or rotor in mesh with an externally toothed rotor with one less tooth than the internally-toothed rotor, can be alternatively executed as hypotrochoidal gear teeth profiles, as shown for example in FIG. 18. In gear sets of this embodiment, the internal teeth profiles of the outer rotor or stator 15 are generated at the radii of a generating circle, the center of which travels along a trochoid. The external gear teeth of the inner rotor 14 are the conjugate of the teeth of stator 15. As shown in FIG. 18, the hypotrochoidal gear tooth geometry provides the continuous contact of all of the gear teeth at all times.

As thus described, the invention this provides axially aligned mechanical gear assemblies wherein meshed gears have a different number of trochoidal gear teeth. The trochoidal profile of the internal teeth of the stators and coupling rotors generate the conjugate trochoidal profile of the external teeth of the rotors which are in continuous wiping contact with the circular internal teeth as the internal rotor rotates and/or orbits within the stator or coupling rotor. The use of these conjugate gear tooth forms in the described purely mechanical (i.e., non-hydraulic) gear reduction assemblies provides the unobvious advantages of, among others, inherent gear reduction in an aligned drive line, greater force distribution throughout the gear teeth, smooth operation as an inherent characteristic of the gear tooth forms, a large variety of possible gear reduction ratios, and the ability to construct a compact gear reduction unit as a result of the single plane alignment of the internally meshed gear sets.

Although the invention has been specifically described with respect to certain preferred and alternate embodiments, the many additional and alternative applications and variations of the basic concepts of the invention, the use of meshed gears having differing numbers of teeth for pure mechanical power transmission through axially aligned input and output shafts, including gear reduction and differential drive, that may be apparent to those of skill in the art from the foregoing description are all within the scope of the invention.

TABLE I

GEAR REDUCTION RATIOS $$\omega_R = \frac{1-N}{1+\left(\frac{N}{n-1}\right)}$$

| N\n | 6 | 7 | 8 | 9 | 10 | 11 | 12 | 13 | 14 | 15 | 16 |
|---|---|---|---|---|---|---|---|---|---|---|---|
| 5 | −2.000 | −2.182 | −2.333 | −2.462 | −2.571 | −2.667 | −2.750 | −2.824 | −2.889 | −2.947 | −3.000 |
| 6 | −2.273 | −2.500 | −2.692 | −2.857 | −3.000 | −3.125 | −3.235 | −3.333 | −3.421 | −3.500 | −3.571 |
| 7 | −2.500 | −2.769 | −3.000 | −3.200 | −3.375 | −3.529 | −3.667 | −3.789 | −3.900 | −4.000 | −4.091 |
| 8 | −2.692 | −3.000 | −3.267 | −3.500 | −3.706 | −3.889 | −4.053 | −4.200 | −4.333 | −4.455 | −4.565 |
| 9 | −2.857 | −3.200 | −3.500 | −3.765 | −4.000 | −4.211 | −4.400 | −4.571 | −4.727 | −4.870 | −5.000 |
| 10 | −3.000 | −3.375 | −3.706 | −4.000 | −4.263 | −4.500 | −4.714 | −4.909 | −5.087 | −5.250 | −5.400 |
| 11 | −3.125 | −3.529 | −3.880 | −4.211 | −4.500 | −4.762 | −5.000 | −5.217 | −5.417 | −5.600 | −5.769 |
| 12 | −3.235 | −3.667 | −4.053 | −4.400 | −4.714 | −5.000 | −5.261 | −5.500 | −5.720 | −5.923 | −6.111 |
| 13 | −3.333 | −3.789 | −4.200 | −4.571 | −4.909 | −5.217 | −5.500 | −5.760 | −6.000 | −6.222 | −6.429 |
| 14 | −3.421 | −3.900 | −4.333 | −4.727 | −5.087 | −5.417 | −5.720 | −6.000 | −6.259 | −6.500 | −6.724 |
| 15 | −3.500 | −4.000 | −4.455 | −4.870 | −5.250 | −5.600 | −5.923 | −6.222 | −6.500 | −6.759 | −7.000 |
| 16 | −3.571 | −4.091 | −4.565 | −5.000 | −5.400 | −5.769 | −6.111 | −6.429 | −6.724 | −7.000 | −7.258 |
| 17 | −3.636 | −4.174 | −4.667 | −5.120 | −5.538 | −5.928 | −6.286 | −6.621 | −6.933 | −7.226 | −7.500 |
| 18 | −3.696 | −4.250 | −4.760 | −5.231 | −5.667 | −6.071 | −6.448 | −6.800 | −7.129 | −7.438 | −7.727 |
| 19 | −3.750 | −4.320 | −4.846 | −5.333 | −5.788 | −6.207 | −6.600 | −6.968 | −7.313 | −7.636 | −7.941 |
| 20 | −3.800 | −4.385 | −4.926 | −5.429 | −5.897 | −6.333 | −6.742 | −7.125 | −7.485 | −7.824 | −8.143 |
| 21 | −3.848 | −4.444 | −5.000 | −5.517 | −6.000 | −6.452 | −6.875 | −7.273 | −7.647 | −8.000 | −8.333 |
| 22 | −3.889 | −4.500 | −5.069 | −5.600 | −6.097 | −6.583 | −7.000 | −7.412 | −7.800 | −8.167 | −8.514 |
| 23 | −3.929 | −4.552 | −5.133 | −5.677 | −6.188 | −6.667 | −7.118 | −7.543 | −7.944 | −8.324 | −8.684 |
| 24 | −3.956 | −4.600 | −5.194 | −5.750 | −6.273 | −6.765 | −7.229 | −7.687 | −8.081 | −8.474 | −8.846 |
| 25 | −4.000 | −4.645 | −5.250 | −5.818 | −6.353 | −6.857 | −7.333 | −7.784 | −8.211 | −8.615 | −9.000 |
| 26 | −4.032 | −4.688 | −5.303 | −5.882 | −6.429 | −6.944 | −7.432 | −7.895 | −8.333 | −8.750 | −9.146 |
| 27 | −4.083 | −4.727 | −5.353 | −5.943 | −6.500 | −7.027 | −7.526 | −8.000 | −8.450 | −8.878 | −9.286 |
| 28 | −4.091 | −4.765 | −5.400 | −6.000 | −6.588 | −7.105 | −7.615 | −8.100 | −8.561 | −9.000 | −9.419 |
| 29 | −4.118 | −4.800 | −5.444 | −6.054 | −6.632 | −7.179 | −7.700 | −8.195 | −8.687 | −9.116 | −9.545 |
| 30 | −4.143 | −4.833 | −5.486 | −6.105 | −6.692 | −7.250 | −7.780 | −8.286 | −8.767 | −9.227 | −9.667 |

| N\n | 17 | 18 | 19 | 20 | 21 | 22 | 23 | 24 | 25 | 26 | 27 |
|---|---|---|---|---|---|---|---|---|---|---|---|
| 5 | −3.046 | −3.091 | −3.130 | −3.167 | −3.200 | −3.231 | −3.259 | −3.286 | −3.310 | −3.333 | −3.355 |
| 6 | −3.636 | −3.696 | −3.750 | −3.800 | −3.846 | −3.889 | −3.929 | −3.966 | −4.000 | −4.032 | −4.063 |
| 7 | −4.174 | −4.250 | −4.320 | −4.385 | −4.444 | −4.500 | −4.552 | −4.600 | −4.645 | −4.688 | −4.727 |
| 8 | −4.667 | −4.760 | −4.846 | −4.926 | −5.000 | −5.069 | −5.133 | −5.194 | −5.250 | −5.303 | −5.353 |
| 9 | −5.120 | −5.231 | −5.333 | −5.429 | −5.517 | −5.600 | −5.677 | −5.750 | −5.818 | −5.882 | −5.943 |
| 10 | −5.538 | −5.667 | −5.786 | −5.897 | −6.000 | −6.097 | −6.188 | −6.273 | −6.353 | −6.429 | −6.500 |
| 11 | −5.926 | −6.071 | −6.207 | −6.333 | −6.452 | −6.583 | −6.667 | −6.765 | −6.857 | −6.944 | −7.027 |
| 12 | −6.286 | −6.448 | −6.600 | −6.742 | −6.875 | −7.000 | −7.118 | −7.229 | −7.333 | −7.432 | −7.526 |
| 13 | −6.621 | −6.800 | −6.968 | −7.125 | −7.273 | −7.412 | −7.543 | −7.667 | −7.784 | −7.895 | −8.000 |
| 14 | −6.933 | −7.129 | −7.313 | −7.485 | −7.647 | −7.800 | −7.944 | −8.081 | −8.211 | −8.333 | −8.450 |
| 15 | −7.226 | −7.438 | −7.636 | −7.824 | −8.000 | −8.167 | −8.324 | −8.474 | −8.615 | −8.750 | −8.878 |
| 16 | −7.500 | −7.727 | −7.941 | −8.143 | −8.333 | −8.514 | −8.684 | −8.846 | −9.000 | −9.145 | −9.266 |
| 17 | −7.758 | −8.000 | −8.229 | −8.444 | −8.649 | −8.842 | −9.026 | −9.200 | −9.366 | −9.524 | −9.674 |
| 18 | −8.000 | −8.257 | −8.500 | −8.730 | −8.947 | −9.154 | −9.350 | −9.537 | −9.714 | −9.884 | −10.045 |
| 19 | −8.229 | −8.500 | −8.757 | −9.000 | −9.231 | −9.450 | −9.659 | −9.857 | −10.047 | −10.227 | −10.400 |
| 20 | −8.444 | −8.730 | −9.000 | −9.256 | −9.500 | −9.732 | −9.952 | −10.163 | −10.364 | −10.556 | −10.739 |
| 21 | −8.649 | −8.947 | −9.231 | −9.500 | −9.756 | −10.000 | −10.233 | −10.455 | −10.667 | −10.870 | −11.064 |
| 22 | −8.842 | −9.154 | −9.450 | −9.732 | −10.000 | −10.256 | −10.500 | −10.733 | −10.957 | −11.170 | −11.375 |
| 23 | −9.026 | −9.350 | −9.659 | −9.952 | −10.233 | −10.500 | −10.756 | −11.000 | −11.234 | −11.458 | −11.673 |
| 24 | −9.200 | −9.537 | −9.857 | −10.163 | −10.455 | −10.733 | −11.000 | −11.255 | −11.500 | −11.735 | −11.960 |
| 25 | −9.368 | −9.714 | −10.047 | −10.364 | −10.667 | −10.957 | −11.234 | −11.500 | −11.755 | −12.000 | −12.235 |
| 26 | −9.524 | −9.884 | −10.227 | −10.558 | −10.870 | −11.170 | −11.458 | −11.735 | −12.000 | −12.255 | −12.500 |
| 27 | −9.674 | −10.045 | −10.400 | −10.739 | −11.064 | −11.375 | −11.673 | −11.960 | −12.235 | −12.500 | −12.755 |
| 28 | −9.818 | −10.200 | −10.565 | −10.915 | −11.250 | −11.571 | −11.880 | −12.176 | −12.462 | −12.736 | −13.000 |
| 29 | −9.956 | −10.348 | −10.723 | −11.083 | −11.429 | −11.760 | −12.078 | −12.385 | −12.579 | −12.963 | −13.236 |
| 30 | −10.087 | −10.489 | −10.875 | −11.245 | −11.600 | −11.941 | −12.269 | −12.585 | −12.889 | −13.182 | −13.464 |

N = Generating teeth of the outer element
n = Generating teeth of the inner element

What is claimed is:

1. A gear reduction assembly for mechanical power transmission comprising gears having a plurality of trochoidal gear teeth, the gear reduction assembly comprising:

an internally-toothed stator, an externally-toothed coupling rotor having a lesser number of gear teeth than the stator and in mesh within the stator, the coupling rotor further having an axial opening for receiving an eccentric cam attached to a distal end of an input shaft, and an internally-toothed opening, and an externally-toothed output rotor axially attached to a distal end of an output shaft and in mesh with the internally-toothed opening of the coupling rotor for velocity-reduced rotational power transmission from the input shaft to the output shaft.

2. The gear reduction assembly of claim 1 further comprising a cam follower disposed about the eccentric cam.

3. The gear reduction assembly of claim 1 further comprising a housing which surrounds the rotors and supports bearings which support the input shaft and the output shaft.

4. The gear reduction assembly of claim 3 wherein the stator is fixed to the housing.

5. The gear reduction assembly of claim 1 wherein a depth of the teeth of the stator is equal to twice the eccentric of the cam.

6. The gear reduction assembly of claim 1 wherein the cam is attached to the input shaft by splined engagement.

7. The gear reduction assembly of claim 1 wherein the number of external gear teeth of the coupling rotor is one less than the number of gear teeth of the stator.

8. The gear reduction assembly of claim 1 wherein the number of gear teeth of the output rotor is one less than the number of gear teeth in the internally-toothed opening of the coupling rotor.

9. The gear reduction assembly of claim 1 wherein gear teeth profiles of external gear teeth are generated as a function of gear teeth profiles of internal gear teeth.

10. The gear reduction assembly of claim 1 wherein gear teeth profiles of internal gear teeth are generated as a function of gear teeth profiles of external gear teeth.

11. A gear reduction series assembly utilizing multiple sets of gears having differing numbers of meshed conjugate trochoidal form gear teeth, the gear assembly comprising:

a stator having an array of internal gear teeth, a first coupling rotor having external trochoidal gear teeth in mesh with the internal gear teeth of the stator, the first coupling rotor having a lesser number of gear teeth than the stator and further comprising an axial bore, and internal gear teeth, a cam eccentrically mounted on a distal end of an input shaft which passes through the stator, the cam received in the axial bore in the first coupling rotor, the external gear teeth of the first output rotor in mesh with the internal gear teeth of the first coupling rotor, a connecting shaft eccentrically axially attached at one end to the first output rotor and an opposite end of the connecting shaft received in an axial bore in a second coupling rotor, the second coupling rotor having external gear teeth in mesh with the internal gear teeth of the stator, the second coupling rotor further comprising an axial bore with internal gear teeth, and a second output rotor having external gear teeth in mesh with the internal gear teeth of the second coupling rotor.

12. The gear reduction series assembly of claim 11 wherein the number of external gear teeth of the first coupling rotor is one less than the number of internal gear teeth of the stator.

13. The gear reduction series assembly of claim 11 wherein the number of gear teeth of the first output rotor is one less than the number of internal gear teeth of the first coupling rotor.

14. The gear reduction series assembly of claim 11 wherein the number of gear teeth of the second output rotor is one less than the number of internal gear teeth of the second coupling rotor.

15. The gear reduction series assembly of claim 11 wherein the input shaft, connecting shaft, and output shaft are generally axially aligned.

16. The gear reduction series assembly of claim 11 wherein the first coupling rotor and output rotor rotate in a direction opposite the second coupling rotor and second output rotor.

17. The gear reduction series assembly of claim 11 wherein the stator comprises a first and second stator having internal gear teeth and wherein the external gear teeth of the first coupling rotor are in mesh with the first stator only and the external gear teeth of the second coupling rotor are in mesh with the second stator only.

18. The gear reduction series assembly of claim 17 wherein the first stator has a different number of gear teeth than the second stator, and the first coupling rotor has a different number of external teeth than the second coupling rotor.

19. The gear reduction series assembly of claim 11 further comprising a housing which supports the stator and the input and output shafts.

20. A gear assembly for transmitting rotational motion from an input shaft to an output shaft axially aligned with said input shaft, said gear assembly comprising:

at least one stator having a generally annular internal array of trochoidal gear teeth, at least one rotor having a generally annular external array of trochoidal gear teeth conjugate to and in mesh with said trochoidal gear teeth of said stator, said rotor having one less gear tooth than said stator, and wherein all of said gear teeth of said stator are in continuous contact with all of said gear teeth of said rotor, the rotor further comprising a generally annular array of internal trochoidal gear teeth, said rotor being eccentrically axially mounted upon an input shaft for rotation within said stator, and means for connecting said rotor to an output shaft axially aligned with said input shaft whereby rotation of said input shaft is transmitted to said output shaft through said gear assembly.

21. A gear reduction assembly for mechanical power transmission comprising gears with internal radiused gear teeth in mesh with gears having external epitrochoidal gear teeth, the gear reduction assembly comprising:

an internally-toothed stator having circular gear teeth profiles which provide the generating tooth form of a conjugate curve of external epitrochoid gear teeth of an externally-toothed coupling rotor in mesh with the internal gear teeth of the stator, the external epitrochoid gear teeth of the coupling rotor generated as a function of the number of internal gear teeth of the stator, an eccentricity of a cam on which the coupling rotor is mounted, and by an overextended radius of a generating ratio circle which rolls about a mating ratio circle without slipping, the coupling rotor having a lesser number of gear teeth than the stator, the coupling rotor further having an axial opening for receiving an eccentric cam attached to a distal end of an input shaft, and an internally-toothed opening, the gear teeth in the internally-toothed opening in the coupling rotor providing a generating tooth form for external epitrochoid gear teeth of an externally-toothed output rotor axially attached to a distal end of an output shaft and in mesh with the internally-toothed opening of the coupling rotor, the external epitrochoid gear teeth of the output rotor generated as a function of the number of internal gear teeth of the coupling rotor, the eccentricity of the cam on which the coupling rotor is mounted, and by an overextended radius of a generating ratio circle which rolls about a mating ratio circle without slipping, the output rotor having a lesser number of gear teeth than the number of internal gear teeth of the coupling rotor.

22. A gear reduction assembly for mechanical power transmission comprising gears with internal hypotrochoidal gear teeth in mesh with gears having external circular profile gear teeth, the gear reduction assembly comprising:

an internally-toothed stator having hypotrochoid gear teeth profiles generated as a function of radii of circular gear teeth profiles of external gear teeth of a coupling rotor in mesh with the internal gear teeth of the stator, and as a function of the number of external gear teeth of the coupling rotor and an eccentric of a cam on which the coupling rotor is mounted, the coupling rotor having a lesser number of gear teeth than the stator, the coupling rotor further having an axial opening for receiving an eccentric cam attached to a distal end of an input shaft, and having an internally-toothed opening with gear teeth having hypotrochoid gear teeth profiles, the profiles of the internal hypotrochoid gear teeth of the opening in the coupling rotor generated as a function of a number of external gear teeth of an output rotor in mesh with the gear teeth in the opening in the coupling rotor, and the eccentricity of the cam on which the coupling rotor is mounted, and as a function of radii of circular gear teeth profiles of the external gear teeth of the output rotor.

* * * * *